US005432996A

United States Patent [19]

Imgrut et al.

[11] Patent Number: 5,432,996

[45] Date of Patent: Jul. 18, 1995

[54] APPARATUS FOR THE ASSEMBLY OF GROMMETS ON ELECTRICAL CABLES

[75] Inventors: Peter Imgrut, Buchrain; Claudio Meisser, Cham; Arthur Baumann, Kreins, all of Switzerland

[73] Assignee: Komax Holding AG, Meggen, Switzerland

[21] Appl. No.: 238,724

[22] Filed: May 5, 1994

[30] Foreign Application Priority Data

May 6, 1993 [CH] Switzerland ........................ 01398/93

[51] Int. Cl.[6] ................................................ B23P 19/04

[52] U.S. Cl. ........................................ 29/754; 29/235; 29/450; 29/792; 29/809

[58] Field of Search ................. 29/235, 450, 451, 464, 29/748, 754, 785, 792, 793, 809, 854; 174/65 G

[56] References Cited

U.S. PATENT DOCUMENTS 2,683,924 7/1954 Schryver ................................ 29/754
3,807,021 4/1974 Birkett .................................... 29/754
4,653,182 3/1987 Fukuda et al. ..................... 29/792 X
5,007,164 4/1991 Kato ................................. 29/235 X
5,016,346 5/1991 Gerst et al. ......................... 29/450 X
5,315,757 5/1994 Koch et al. ............................ 29/754

FOREIGN PATENT DOCUMENTS 0159006 10/1985 European Pat. Off. .............. 29/792
0410416 1/1991 European Pat. Off. .
0462923 12/1991 European Pat. Off. .
0534106 3/1993 European Pat. Off. .............. 29/754
2650126 1/1991 France .
2235885 3/1991 United Kingdom .

OTHER PUBLICATIONS

European Search Report and Annex in German, Mar. 18 1994, RS91719.

*Primary Examiner*—Peter Vo
*Attorney, Agent, or Firm*—Sandler, Greenblum & Bernstein

[57] ABSTRACT

An apparatus for the assembly of grommets on electrical cables for use in an automatic cable-processing machine, which is simple and cost effectively constructed so as to achieve a shorter assembly time, per grommet, and utilizes a step-wise rotatable turning device which includes several mandrels whereby, in a first setting (I), always one grommet is pushed onto a mandrel while in a second setting (II) of the turning device, the grommet is pushed, via a slip-on unit, onto a thicker portion of the mandrel for the purpose of expansion, with an assembly head including a grommet-receiving portion and an expanding portion by means of which, in a further setting (IV) of the turning device, the grommet is pulled from the mandrel, whereby the grommet is held in an expanded state, using the expanding portion and pushed onto the cable.

10 Claims, 5 Drawing Sheets

APPARATUS FOR THE ASSEMBLY OF GROMMETS ON ELECTRICAL CABLES

CROSS REFERENCE TO RELATED APPLICATIONS

This application claims the priority of Swiss Application No. 01/398/93-0, filed May 6, 1993, the disclosure of which is incorporated herein by reference in its entirety.

BACKGROUND OF THE INVENTION

1. Field of the Invention

The invention pertains to an apparatus for the assembly of grommets on electrical cables or wires, having a drum adapted to be filled with grommets, and open on at least a front side, which is adapted to be driven about an axis inclined relative to a horizontal plane, having scoops or vanes arranged on the inside of the drum and having a conveyor guide rail extending into the drum which receives, during rotation of the drum, the grommets for the purpose of proper orientation, storage and further conveyance, wherein a discharge device, having an upwardly and downwardly movable centering mandrel, from which the first grommet in the conveyor or guide rail is always conveyed to a turning device.

2. Discussion of the Background of the Invention and Material Information

With apparatuses of the type noted above, grommets, which for example, are required for the moisture-proof passage or feed-through of electrical cables through the housing walls of electrical devices, can be economically pushed onto the cables.

In an apparatus of the above type and known from EP-A-0 534 106, the grommets are properly oriented in a buffer storage of the conveyor guide rail. Being aligned with the axis of a vertical bore of a first grommet in the buffer storage, a single cylinder, having an upwardly and downwardly movable mandrel, is arranged or located above the conveyor guide rail, and a pivotable assembly cylinder, having a grommet-receiving portion sitting on a piston rod thereof, is arranged below the conveyor guide rail, whereby the grommet, via the mandrel, is pushed through the vertical bore into the grommet-receiving portion or grommet-holding part and the assembly cylinder is pivoted in a horizontal position. Thereafter, pivotable gripper jaws surround the grommet-receiving portion and are moved, together with the piston rod, against the cable, whereby the grommet is pushed onto the cable. During this operation, the grommet bore is slightly expanded, via a supply of air under pressure, so as to ease the pushing of the grommet. With the use of this method, malfunctions can however occur, depending upon the flexibility, composition or sizing accuracy of the cable and/or the grommets.

A further grommet assembly apparatus is described in EP-A- 0 410 416, in which the grommets are mechanically expanded before being pushed onto an electrical cable. During this operation, a grommet that has been brought to an outlet position, is initially received on a mandrel and pushed up to a ring-shaped elastic abutment in a grommet-receiving portion. The mandrel is conically shaped so that, during its further movement, the grommet is expanded. The cylindrical portion of the mandrel carries a sleeve, which, during the further movement for the purpose of expansion, is positively moved with the mandrel and enters into the grommet bore. When the sleeve has reached the elastic abutment, the mandrel is pulled back, with the sleeve remaining at the noted position. Thereafter, the cable, at the already stripped end, is pushed from the other side of the grommet-receiving portion, through the ring-shaped abutment, onto the sleeve, which is then pulled back so that the grommet can clamp itself or contract onto the cable. Subsequently, the grommet-receiving portion opens so that the cable is released. The previously-described apparatus is quite complicated and expensively constructed, with the components, that are subject to wear, also being difficult to reach. In addition, the assembly time per grommet, which is influenced by the noted construction, is relatively long.

SUMMARY OF THE INVENTION

A primary purpose or object of the present invention is to provide an apparatus of the previously-described type, which, avoids the previously noted disadvantages and is specifically constructed more simply and has a shorter assembly time per grommet.

The object or purpose of this invention is achieved via an apparatus, for use in an automatic cable-processing machine, for the assembly of grommets on electrical cables, wherein the assembly apparatus comprises a drum adapted to be filled with grommets and open on at least a front side thereof, with the drum being adapted to be driven about an axis inclined relative to a horizontal plane; vanes arranged on the interior of the drum; a conveyor guide rail extending into the drum, the guide rail receiving, during the rotation of the drum, the grommets for the purpose of properly oriented storage and further conveyance of the grommets; a turning device or rotating assembly; a discharge device having an upwardly and downwardly movable centering mandrel, wherein always the first grommet in the conveyor guide rail is conveyed, via the centering mandrel, to the turning device; the turning device including several mandrels and being step-wise further rotatable about a specific angle, wherein in a first setting (I) of the turning device always one grommet is pushed onto a tip of one of the mandrels; a slip-on unit, via which slip-on unit, in a second setting (II) of the turning device, a grommet is pushed, for the purpose of expansion, onto a portion of one of the mandrels whose diameter is greater than the diameter in the area of the tip; and an assembly head, the assembly head including a grommet-receiving portion and an expanding portion, via which grommet-receiving and expanding portions, at a further setting (IV) of the turning device, the grommet is pulled from the mandrel, whereby the grommet is retained in an expanded state using the expanding portion and pushed onto a cable.

In a further embodiment of the assembly apparatus of this invention the turning device includes four mandrels, the mandrels being arranged offset, relative to each other, at an angle of 90°, and the turning device is step-wise further rotatable at an angle of 90°.

In another embodiment of the assembly apparatus of this invention, the slip-on unit includes two adjacent profile plates, each profile plate having an opposed half bore, with the half bores, in the second setting (II) of turning device, always being aligned with a mandrel, with the molding plates being attached at holders, the holders being flexibly connected, using bolts and springs, with a carrier movable in the direction of the aligned mandrel.

In yet a further embodiment of the assembly apparatus of this invention the grommet-receiving portion is comprised of two adjacent jaws, each of the jaws including opposed halves of a cylindrical recess; the cylindrical recesses being adapted to the shape of the grommets to be processed; and the jaws being radially opposed and movable, and located on a guide carrier.

In yet another embodiment of the assembly apparatus of this invention, the expanding portion is comprised of two further adjacent jaws, each of the further jaws including opposed halves of a tubular projection and a projecting bore extending through the tubular projection; the diameter of the projecting bore being so dimensioned, that the cable to be assembled can be introduced into the projecting bore; the projecting bore including, on the side opposite from the tubular projection of the further jaws, a funnel-shaped extension; and the further jaws being radially oppositely movably arranged on a further guide carrier.

In an additional embodiment of the assembly apparatus of this invention, the jaws and the further jaws are coupled together and simultaneously movable.

In still another embodiment of the assembly apparatus of this invention, the grommet-receiving portion and the expanding portion are movable relative to each other in an axial direction of the cylindrical recess of the bore; t h e grommet-receiving portion being connected with a housing, the housing being movable in an axis direction of the cylindrical recess of the bore; and the grommet-receiving portion and the expanding portion being so arranged that the cylindrical recess and the projecting bore, in the further setting (IV) of turning device , are aligned with one of the mandrels.

In a final embodiment of the assembly apparatus of this invention, the drum rests loosely on rollers and is driven by at least one of the rollers, and the drum further includes a projecting edge , the projecting edge being supported on a further support roller, the further support roller, in turn being rotatable about an axis that is vertical or parallel to the axis of the drum.

The advantages achieved with this invention reside in the relatively simple and cost effective construction together with easy access to the wear-prone components. In addition, with the subject apparatus the assembly time, per grommet, can be reduced since three separate assembly processing operations can be carried out simultaneously. Preferably, the drum rests loosely upon the drive and guide rollers, so that a quick change, for example during a change of the types of grommets, is readily possible.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have generally been used the same reference characters to denote the same or analogous components and wherein.

DETAILED DESCRIPTION OF THE PREFERRED EMBODIMENTS

With respect to the drawings it is to be understood that only enough of the construction of the invention and the surrounding environment in which the invention is employed have been depicted therein, in order to simplify the illustrations, as needed for those skilled in the art to readily understand the underlying principles and concepts of the invention.

Figure 1:
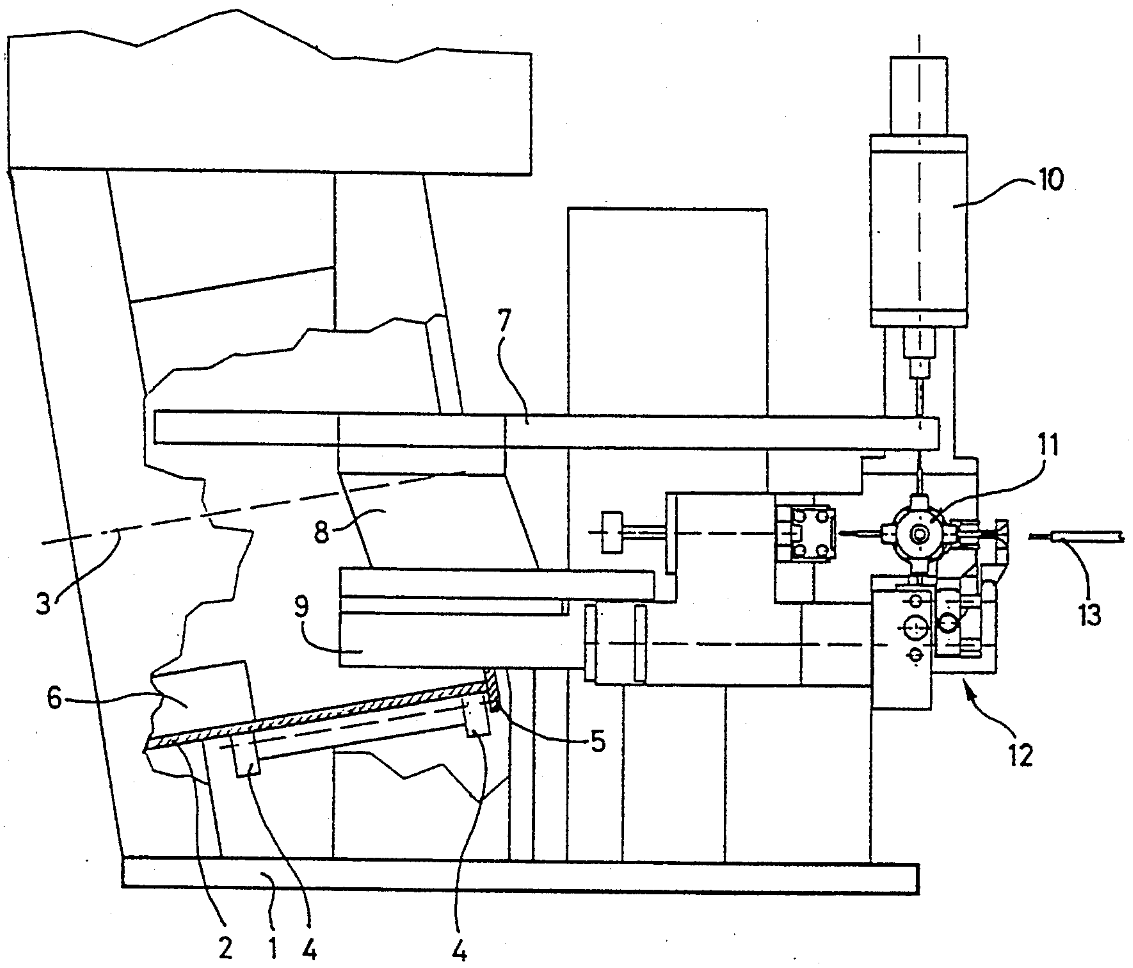
FIG. 1 is a partially sectioned view of the apparatus of this invention.

In FIG. 1, a machine frame is denominated by numeral 1, upon which a drum 2 is journalled on an axis 3 inclined to a horizontal plane. Drum 2 rests loosely upon rollers 4 so that a quick exchange is possible, which, for example, is necessary for the use of other grommets. Drum 2 can be driven by at least one of rollers 4, however the particular roller 4 is driven in a manner not further described herein. A projecting edge 5 of drum 2 is supported on a non-illustrated support roller, which is rotatable about an axis that is vertical or parallel to axis 3. Therewith, the sliding off of drum 2, in the axial direction, is prevented.

Figure 2:
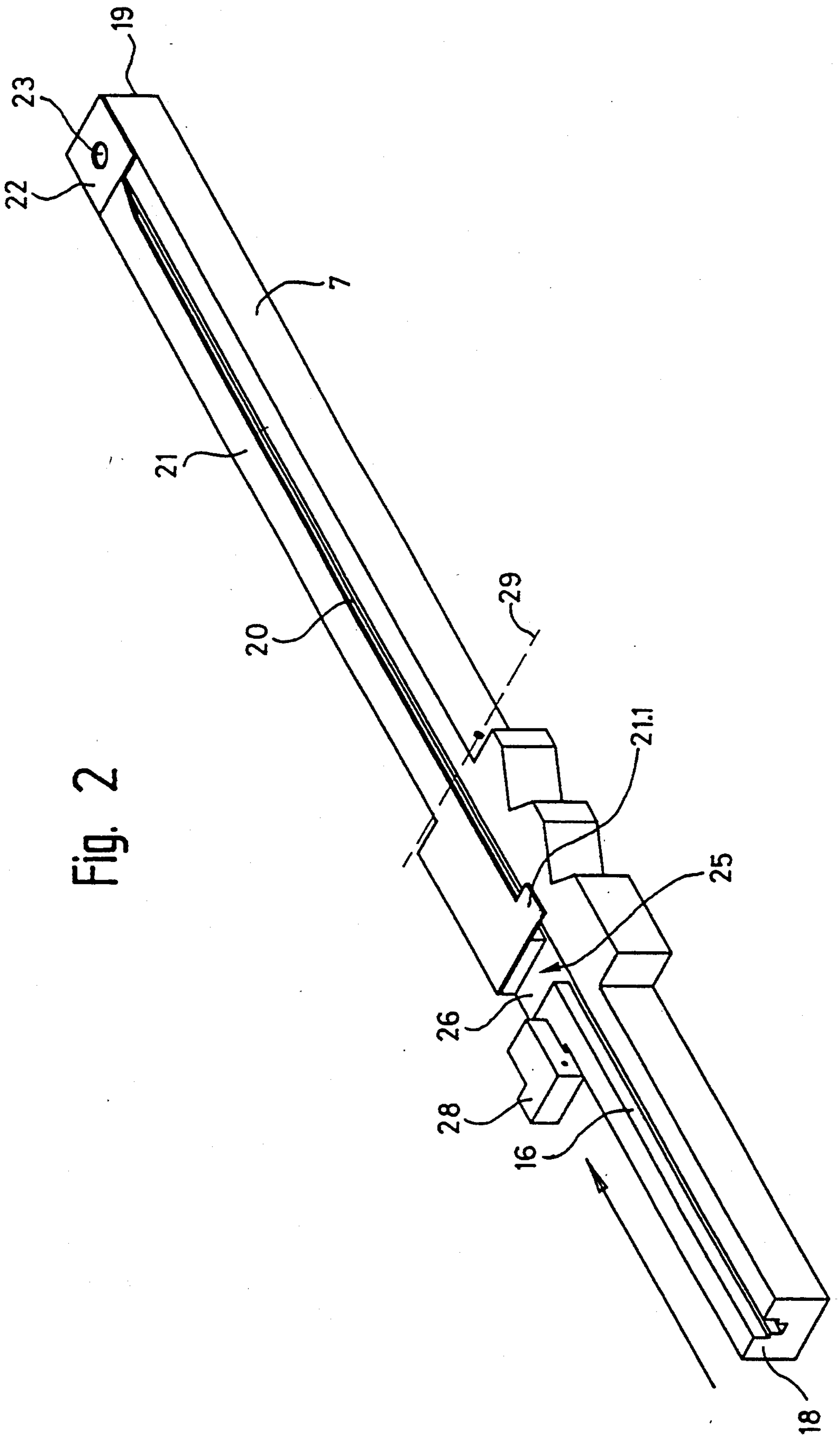
FIG. 2 shows a conveyor guide rail of the apparatus of FIG. 1, in perspective and at a larger scale.

In the interior of drum 2, scoops or vanes 6 are attached at the lower end thereof, via which grommets resting therein, for attachment to electrical cables or wires, can be conveyed to a conveyor guide rail 7, with conveyor guide rail 7, via an open front face of drum 2 extending therethrough into drum 2 at its elevated end. Drum 2 is preferably made of transparent plastic so that optical inspection of the grommet supply and the delivery process is possible. Conveyor guide rail 7, which will be described in more detail with reference to FIG. 2, is attached to a linear oscillating conveyor 8 which is arranged on a part 9 of machine frame 1. Numeral 10 denotes a discharge device and numeral 11 denotes a turning device or rotating assembly of a grommet assembly arrangement 12, attached to machine frame 1, which will be described in more detail with reference to FIG. 3, and which is supplied with an electrical cable 13, having one end stripped of insulation, by a non-illustrated automatic cable processing machine.

As per FIG. 2, conveyor guide rail 7 has a longitudinally-extending groove 16, whose cross-section corresponds approximately to the outline of a longitudinal section of a grommet 17 (FIGS. 4*a*–4*e*). Groove 16 is open at the rear end 18, but closed at the front end 19 of conveyor guide rail 7 (FIGS. 4*a*–4*e*). The front portion of groove 16, in the direction of conveyance (arrow 14 in FIG. 2), serves as a buffer storage 20 in which the grommets are stored in proper orientation and covered with a cover sheet 21. Cover sheet 21 covers half of groove 21 so that the stored grommets are visible. At the inlet the buffer storage, cover sheet 21 includes an overhang 21.1 which fully covers groove 16. Front end 19 of conveyor guide rail 7 is covered with a plate 22 that has a bore 23 whose axis coincides with the axis of the first grommet in buffer storage 20.

Underneath the first grommet in buffer storage 20, a vertical bore 24 (FIGS. 4*a*–4*e*) is provided in conveyor guide rail 7 whose axis also coincides with the axis of the first grommet, and whose diameter is smaller than the diameter of grommet 17. In front of the buffer storage inlet there is a sorting baffle 25 and a recess 26 which crosses conveyor guide rail 7 on one side and a non-illustrated blow-out nozzle. Numeral 28 denotes a blow-out nozzle that is arranged ahead of sorting baffle 25. A non-illustrated light sensor is attached behind the buffer storage inlet, whose light beam is symbolized via a dot-dash line 29. In order to enhance the conveyance, the rail can be provided with multiple parallel bores, angled to the direction of conveyance, which terminate in the conveyance groove, out of which emanates a continuously controllable stream of air.

Figure 3:
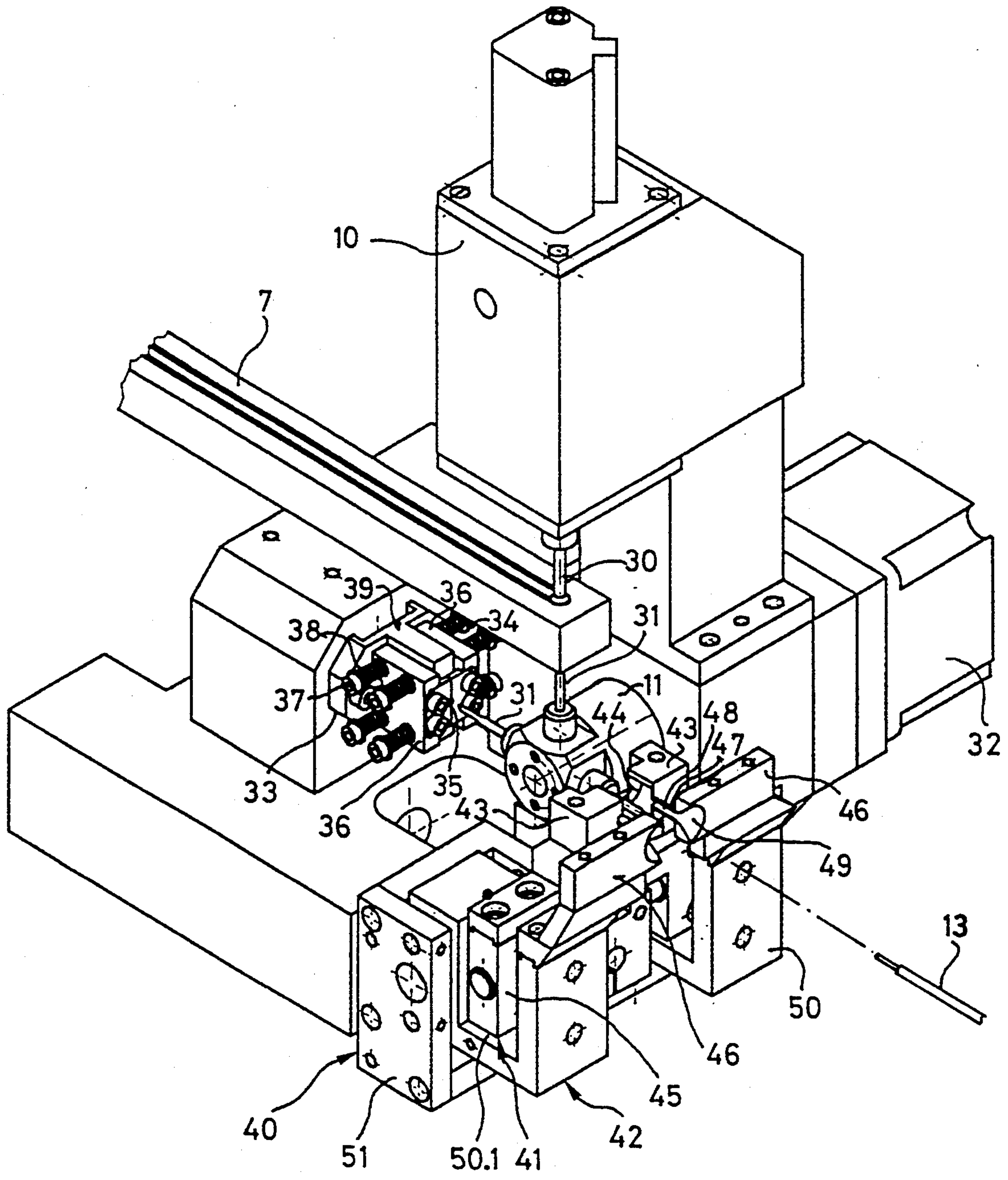
FIG. 3 is a perspective view of a portion of the apparatus of FIG. 1, at a larger scale.

As per FIG. 3, discharge device 10 is arranged as extending above conveyor guide rail 7 in the axis of bore 23 (FIG. 2) and vertical bore 24 (FIGS. 4a–4e). Discharge device 10 includes an upwardly and downwardly moveable centering mandrel 30, which can, for example, be activated pneumatically. Turning device 11, which is arranged underneath conveyor guide rail 7, includes four mandrels 31, which are offset 90½ relative to each other. Turning device 11 can, using a stepping motor 32, be stepped further through an angle of 90½. Mandrels 31 include two different diameters, wherein the diameter in the area of the tip of the mandrel is the smaller one.

Turning device 11 is arranged in such a manner that a mandrel 31 aligns, each time, in a first setting I of turning device 11, with vertical bore 24 (FIGS. 4a–4e) of conveyor guide rail 7. Numeral 33 denotes a sliding unit which includes two profile plates 34, each of which contains one half of a bore 35 which, in a second setting II of turning device 11, is always aligned with a mandrel 31. Profile plates 34 are attached to holders 36 which are, via bolts 37 and springs 38, elastically connected with a carrier 39. Carrier 39 can be moved, pneumatically for example, in a straight line in the direction of mandrel 31.

An assembly head 40 includes a grommet-receiving portion 41 and an expanding portion 42. Grommet-receiving portion 41 is comprised of two jaws 43, each of which includes half of a cylindrical recess 44, whose size corresponds to the form of the grommets being processed. Jaws 43 are located radially opposed and are movable, for example pneumatically, on a guide carrier 45. Expanding portion 42 is comprised of two further jaws 46, each of which includes half of a tubular projection 47 and a bore 48 extending therethrough. Bore 48 includes, on the side removed from tubular projection 47 of further jaws 46, a funnel-shaped extension 49 and is so dimensioned that the cable to be assembled can be received therein. Further jaws 46 are movable on a further guide carrier 50, whereby they are movable together with jaws 43.

Grommet-receiving portion 41 and expanding portion 42 are arranged in such a manner that the cylindrical recess 41 and bore 48 are aligned with one of the mandrels 31 in a further setting IV of turning device 11, wherein further setting IV, relative to second setting II, is displaced at an angle of 180½. Grommet-receiving portion 41 is movable within a U-shaped recess 50.1 of further guide carrier 50 and movable, pneumatically for example, in the axial direction of cylindrical recess 44. Further guide carrier 50 is connected with a housing 51 which can be moved, again pneumatically for example, in the axial direction of cylindrical recess 44 and bore 48, together with grommet-receiving portion 41 and expanding portion 42.

Figure 4A:
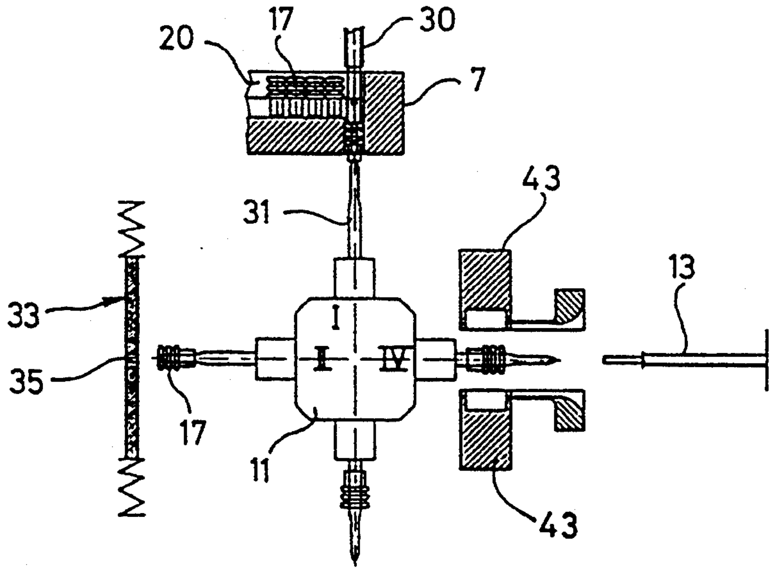
FIGS. 4*a* to 4*e* are progressive views of the assembly process of the grommets.
Figure 4B:
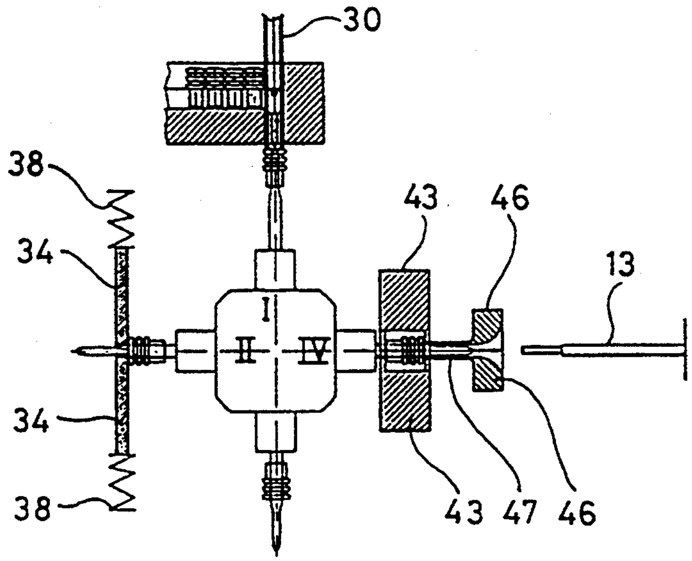

The previously-described apparatus operates as follows: It is assumed initially that grommets 17, as described in more detail in EP-A 0 534 106, are stored, in the proper orientation in conveyor guide rail 7. In this operation, the foremost grommet 17 is always conveyed, in buffer storage 20, to bore 24 (FIG. 4d). Grommet 17 is now pushed, using centering mandrel 30 of discharge device 10, to the tip of one of the mandrels 31 that is present at first position I (FIGS. 4a, 4b). At the same time, another grommet 17 residing on a mandrel 31 that is positioned at second position II, is pushed, via sliding unit 33, onto the thicker part of mandrel 31, whereby the grommet is extended and brought to the correct position. Since bore 35 is smaller than mandrel 31, this results in molding plates 34 being pushed apart (FIG. 4a, 4b) against the force of springs 38. At the same time, a further grommet 17, residing on a mandrel 31 that is positioned at a further position IV, is encircled by jaws 43 of grommet-receiving portion 41, whereby the further jaws 46 of expanding portion 42 are closed (FIGS. 4a, 4b).

Figure 4C:
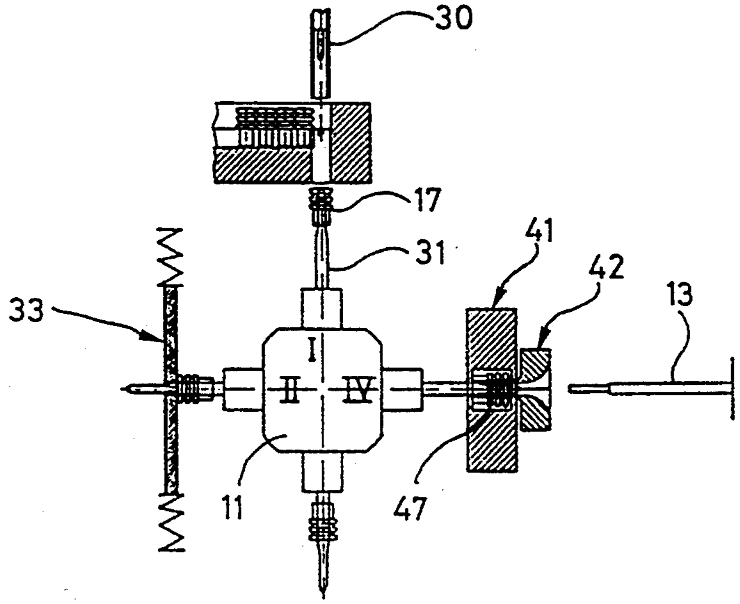
Figure 4D:
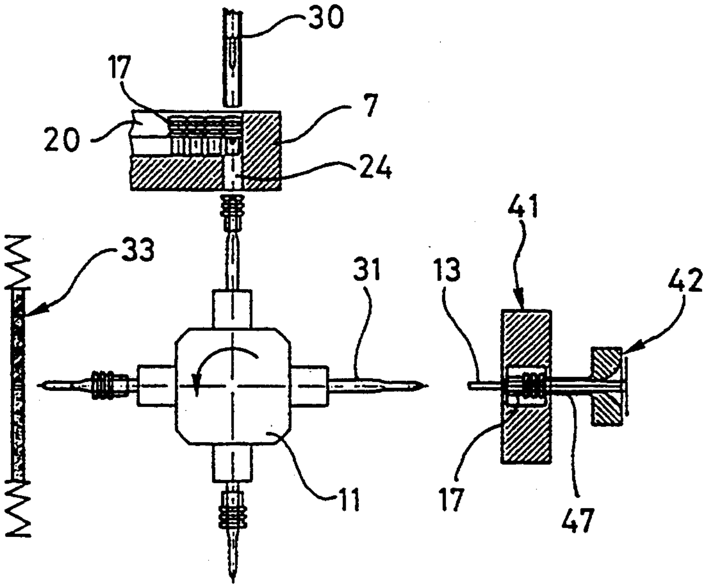
Figure 4E:
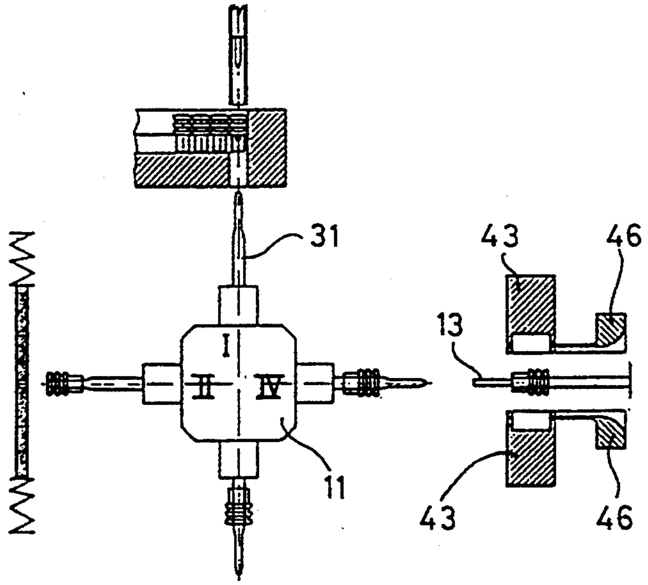

Thereafter, centering mandrel 30 of discharge device 10 is pulled back and grommet-receiving portion 41, together with grommet 17, is pushed against expanding portion 42, whereby tubular projection 47 of expanding portion 42 enters into the grommet bore and again somewhat expands grommet 17 (FIG. 4c). Then, sliding unit 33 is pushed back, with grommet 17 being pulled off mandrel 31, using grommet-receiving portion 41, and transported in the direction of cable 13. In this operation, grommet 17 is kept in an expanded state by expanding portion 42 until the right position is reached on cable 13. Subsequently, expanding portion 42 is displaced, relative to grommet-receiving portion or grommet-holding part 41, whereby grommet 17 is released and contracts onto cable 13 (FIG. 4d). Thereupon, jaws 43 and 46 open, so that the assembled cable 13 can be removed and a new one supplied. At the same time, turning device 11 turns through an angle of 90½ whereby the empty mandrel 31 is turned to first position I and the already grommet laden mandrels 31 are turned to the second and further positon II and IV respectively (FIG. 4e).

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

What is claimed is:

1. An apparatus, for use in an automatic cable-processing machine, for the assembly of grommets on electrical cables, the assembly apparatus comprising:

a drum filled with grommets and open on at least a front side thereof, with the drum being driven about an axis inclined relative to a horizontal plane;

vanes arranged on the interior of the drum;

a conveyor guide rail extending into the drum, the guide rail receiving, during the rotation of the drum, the grommets for the purpose of proper orientation and storage and further conveyance of the grommets;

a rotating assembly;

a discharge device having an upwardly and downwardly movable centering mandrel, wherein the first grommet in the conveyor guide rail is always conveyed, via the centering mandrel, to the rotating assembly;

the rotating assembly including several mandrels, with each mandrel comprising a body portion and a tip portion, the body portion having a diameter greater than a diameter of the tip portion, the rotating assembly being step-wise further rotatable about a specific angle, wherein, in a first setting (I) of the rotating assembly, one grommet is always pushed onto the tip portion of one of the several mandrels;

a slip-on unit, in a second setting (II) of the rotating assembly, for pushing a grommet for the purpose of the expansion thereof, onto the body portion of one of the several mandrels; and an assembly head, the assembly head including a grommet-receiving portion and an expanding portion, via which grommet-receiving and expanding portions, at a further setting (IV) of the rotating assembly, the grommet is pulled from the body portion of one of the several mandrels, whereby the grommet is retained in an expanded state using the expanding portion and pushed onto a cable.

2. The assembly apparatus of claim 1, wherein the rotating assembly includes four mandrels, the mandrels being arranged offset, relative to each other, at an angle of 90°, and wherein the rotating assembly is step-wise further rotatable at an angle of 90°.

3. The assembly apparatus of claim 1, wherein the slip-on unit includes two adjacent profile plates, each molding plate having an opposed half bore, with the half bores, in the second setting (II) of the rotating assembly, always being aligned with a mandrel, with the profile plates being attached to holders, the holders being flexibly connected, using bolts and springs, with a carrier movable in the direction of the aligned mandrel.

4. The assembly apparatus of claim 1, wherein:

the grommet-receiving portion is comprised of two adjacent jaws, each of the jaws including opposed halves of a cylindrical recess;

the cylindrical recesses being adapted to the shape of the grommets to be processed; and the jaws being radially opposed and movable, and located on a guide carrier.

5. The assembly apparatus of claim 1, wherein:

the expanding portion is comprised of two further adjacent jaws, each of the further jaws including opposed halves of a tubular projection and a projecting bore extending through the tubular projection;

the diameter of the projecting bore being so dimensioned, that the cable to be assembled can be introduced into the projecting bore;

the projecting bore including, on the side opposite from the tubular projection of the further jaws, a funnel-shaped extension; and the further jaws being radially oppositely movably arranged on a further guide carrier.

6. The assembly apparatus of claim 1, wherein:

the grommet-receiving portion is comprised of two adjacent jaws, each of the jaws including opposed halves of a cylindrical recess;

the cylindrical recesses being adapted to the shape of the grommets to be processed;

the jaws being radially opposed and movable, and located on a guide carrier;

the expanding portion being comprised of two further adjacent jaws, each of the further jaws including opposed halves of a tubular projection and a projecting bore extending through the tubular projection;

the diameter of the projecting bore being so dimensioned, that the cable to be assembled can be introduced into the projecting bore;

the projecting bore including, on the side opposite from the tubular projection of the further jaws, a funnel-shaped extension; and the further jaws being radially oppositely movably arranged on a further guide carrier.

7. The assembly apparatus of claim 6, wherein the jaws and the further jaws are coupled together and simultaneously movable.

8. The assembly apparatus of claim 6, wherein:

the grommet-receiving portion and the expanding portion are movable relative to each other in an axial direction of the cylindrical recess of the bore;

the grommet-receiving portion being connected with a housing, the housing being movable in an axis direction of the cylindrical recess of the bore; and the grommet-receiving portion and the expanding portion being so arranged that the cylindrical recess and the projecting bore, in the further setting (IV) of turning device, are aligned with one of the mandrels.

9. The assembly apparatus of claim 1, wherein the drum rests loosely on rollers and is driven by at least one of the rollers.

10. The assembly apparatus of claim 9, wherein the drum further includes a projecting edge, the projecting edge being supported on a further support roller, the further support roller, in turn being rotatable about an axis that is vertical or parallel to the axis of the drum.

* * * * *